United States Patent
Itamura et al.

(10) Patent No.: US 7,936,554 B2
(45) Date of Patent: May 3, 2011

(54) MONOLITHIC CERAMIC CAPACITOR

(75) Inventors: Hiroto Itamura, Echizen (JP); Masaaki Taniguchi, Nyuu-gun (JP); Yoshio Kawaguchi, Fukui (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 271 days.

(21) Appl. No.: 12/140,423

(22) Filed: Jun. 17, 2008

(65) Prior Publication Data

US 2008/0310077 A1   Dec. 18, 2008

(30) Foreign Application Priority Data

Jun. 18, 2007   (JP) .................. 2007-160123

(51) Int. Cl.
  H01G 4/005   (2006.01)
  H01G 4/06   (2006.01)
  H01G 4/228   (2006.01)
(52) U.S. Cl. ............. 361/303; 361/311; 361/306.3
(58) Field of Classification Search .... 361/306.1–306.3, 361/303, 311
See application file for complete search history.

(56) References Cited

U.S. PATENT DOCUMENTS

| 7,054,136 | B2 | 5/2006 | Ritter et al. |
| 7,663,862 | B2 * | 2/2010 | Togashi ............ 361/306.3 |
| 2007/0128794 | A1 | 6/2007 | Kusano et al. |

FOREIGN PATENT DOCUMENTS

| JP | 61-151323 A | | 9/1986 |
| JP | 08097070 A | * | 4/1996 |
| JP | 11-204370 A | | 7/1999 |
| JP | 2006-203167 A | | 8/2006 |
| WO | WO 2006022060 A1 | * | 3/2006 |

* cited by examiner

*Primary Examiner* — Eric Thomas
(74) *Attorney, Agent, or Firm* — Keating & Bennett, LLP

(57) ABSTRACT

In a monolithic ceramic capacitor, the size of end surfaces of a capacitor body in a two-dimensional surface in which ceramic layers extend is greater than the size of side surfaces in the two-dimensional surface in which the ceramic layers extend. External terminal electrodes include a resistive component. In each of first to fourth internal electrodes, a width-direction size of a lead-out portion is less than a width-direction size of a capacitance portion. The lead-out portions of the first and third internal electrodes and the lead-out portions of the second and fourth internal electrodes are arranged so as to partially overlap each other or not to overlap each other.

15 Claims, 13 Drawing Sheets

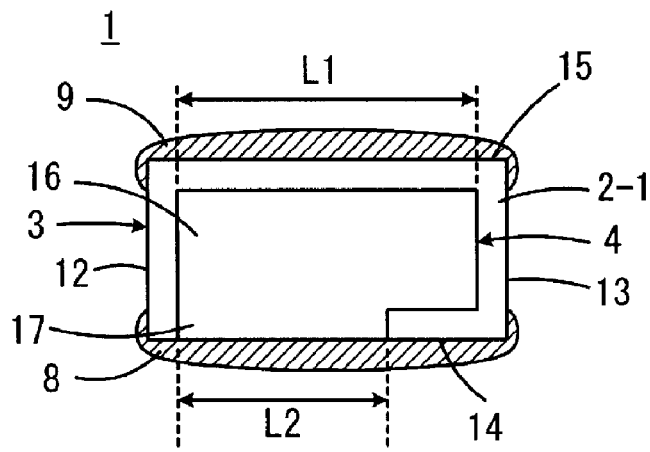
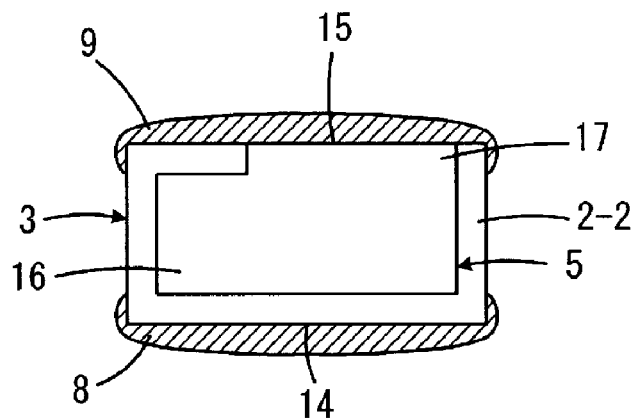
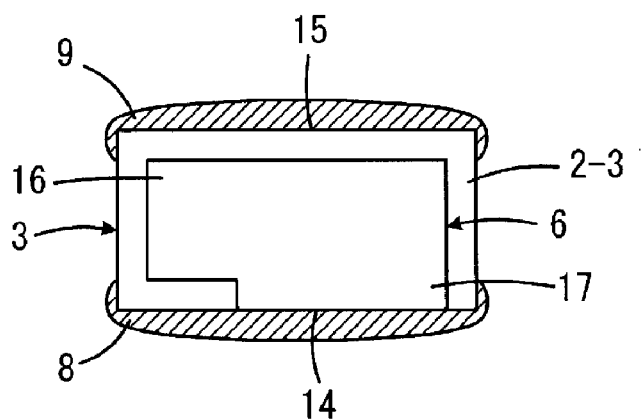
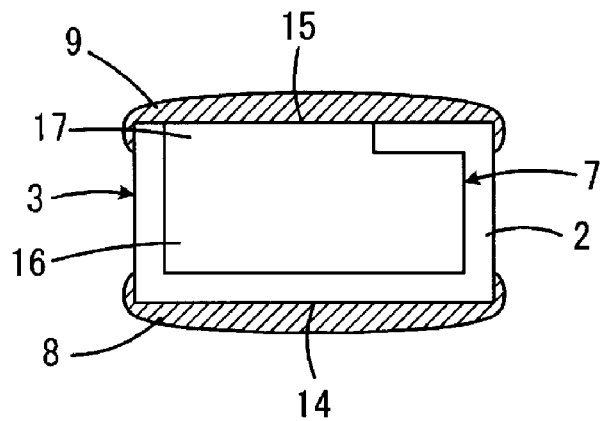

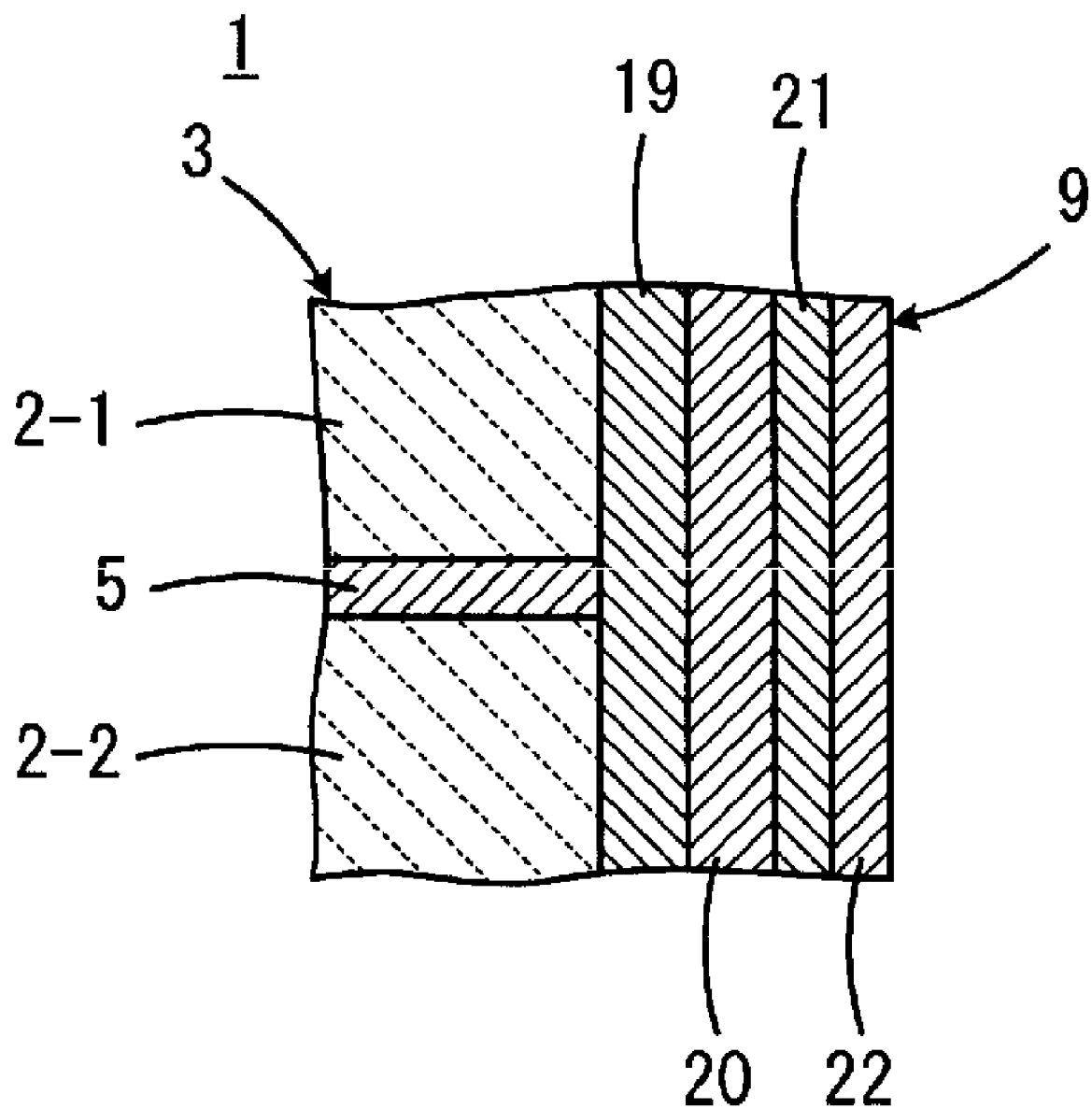

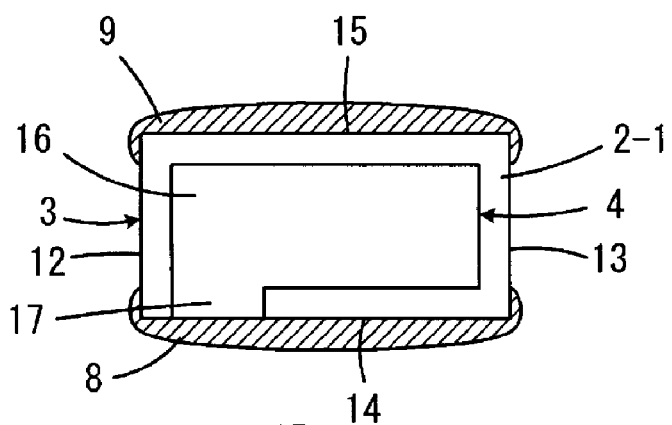
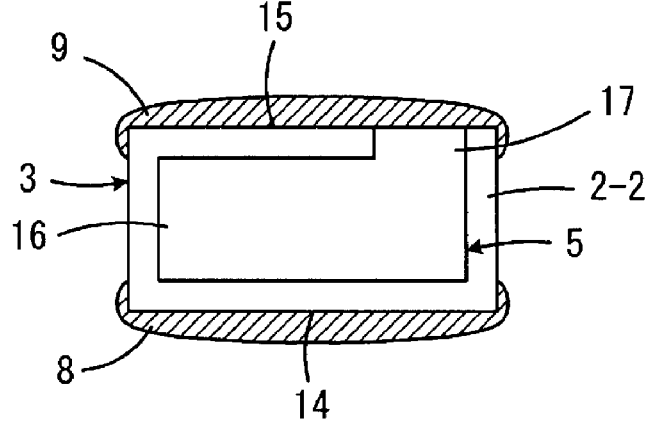
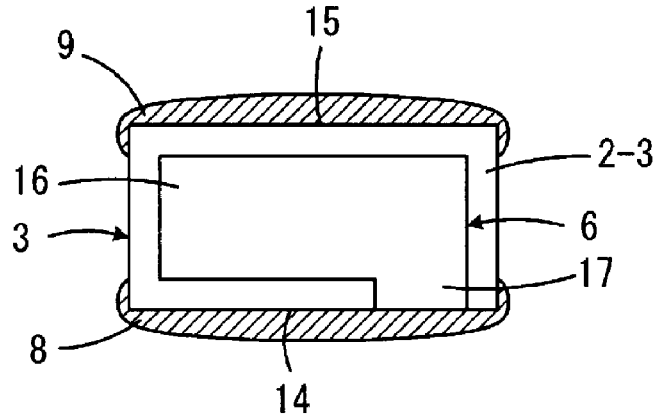
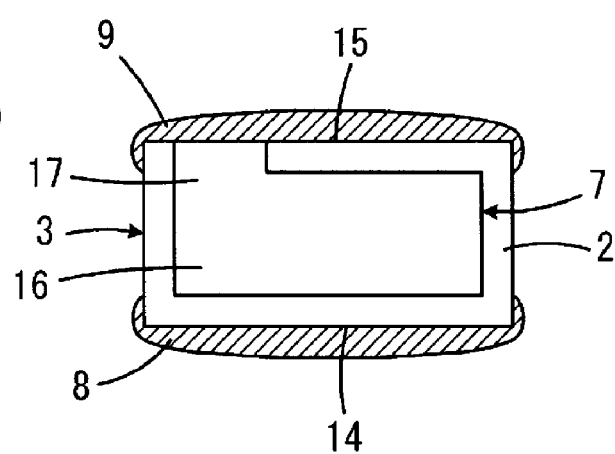

MONOLITHIC CERAMIC CAPACITOR

BACKGROUND OF THE INVENTION

1. Field of the Invention

The present invention relates to monolithic ceramic capacitors, and more particularly, to facilitating control of the equivalent series resistance (ESR) of a monolithic ceramic capacitor including external terminal electrodes including a resistive component.

2. Description of the Related Art

In a power supply circuit, when a voltage change in a power supply line increases due to the impedance existing in the power supply line and ground, the operation of circuits to be driven may become unstable, interference between the circuits may occur via the power supply circuit, and oscillation may occur. To avoid these problems, a decoupling capacitor is often connected between the power supply line and the ground. The decoupling capacitor reduces the impedance between the power supply line and the ground and suppresses changes in the power supply voltage and interference between the circuits.

Recently, the speed of processing signals has been increased in communication apparatuses, such as mobile phones, and information processing apparatuses, such as personal computers, in order to process a large amount of information. Accordingly, the clock frequency of an integrated circuit (IC) used has been increased. Noise including many harmonic components is likely to be generated. Thus, stronger decoupling must be provided in the IC power supply circuit.

Use of a decoupling capacitor with an excellent impedance frequency characteristic is effective to increase the decoupling effect. Such a decoupling capacitor includes a monolithic ceramic capacitor. Since the equivalent series inductance (ESL) of the monolithic ceramic capacitor is small, the monolithic ceramic capacitor can absorb noise over a broad frequency band better than an electrolytic capacitor.

Another function of the decoupling capacitor is to supply a charge to the IC. The decoupling capacitor is usually provided near the IC. When there is a change in the voltage of the power supply line, the decoupling capacitor quickly supplies a charge to the IC, thereby preventing a delay in the activation of the IC.

When a capacitor is charged or discharged, a counterelectromotive force (CEMF) dV expressed by the equation $dV=L \cdot di/dt$ is generated in the capacitor. A large dV results in a delay in supplying a charge to the IC. Since the clock frequency of the IC has been increased, the amount of change in current per unit time di/dt tends to increase. That is, the inductance L must be reduced in order to reduce dV. To reduce the inductance L, the ESL of the capacitor must be further reduced.

A known example of a low-ESL monolithic ceramic capacitor with a reduced ESR is an LW-inverted monolithic ceramic capacitor. In a general monolithic ceramic capacitor, the size in a two-dimensional surface in which ceramic layers extend of two end surfaces of a capacitor body on which external terminal electrodes are provided, that is, the width of the capacitor body, is less than the size in the two-dimensional surface in which the ceramic layers extend of two side surfaces of the capacitor body, that is, the length of the capacitor body. The side surfaces are adjacent to the end surfaces. In contrast, in the LW-inverted monolithic ceramic capacitor, the width of the capacitor body is greater than the length of the capacitor body. Since a current path in the capacitor body of such an LW-inverted monolithic ceramic capacitor is wide and short, the ESL is reduced.

Another known example of a low-ESL monolithic ceramic capacitor is a multi-terminal monolithic ceramic capacitor. In the multi-terminal monolithic ceramic capacitor, there is a plurality of current paths in a dispersed arrangement in a capacitor body, and thus, the ESL is reduced.

In low-ESL monolithic ceramic capacitors, as has been described above, a current path is widened and shortened, or a plurality of current paths are utilitzed in the dispersed arrangement. As a result, the ESR is reduced at the same time.

In contrast, monolithic ceramic capacitors are required to have an increased capacitance. In order to increase the capacitance of a monolithic ceramic capacitor, the number of ceramic layers and the number of internal electrodes that are laminated on one another may be increased. In this case, the number of current paths is increased, and thus, the ESR is reduced.

That is, there is an increased demand on monolithic ceramic capacitors to have a reduced ESL and an increased capacitance. In order to meet these demands, the ESR of the monolithic ceramic capacitors must be further reduced.

When the ESR of a capacitor is reduced too much, impedance mismatching occurs in a circuit, and thus, it is known that damped oscillation called "ringing" in which the rising portion of a signal waveform is distorted is likely to occur. When the ringing occurs, a distorted signal may cause a malfunction of the IC.

When the ESR of a capacitor is reduced too much, the impedance frequency characteristic of the capacitor becomes too steep near the resonant frequency. That is, the valley of an impedance curve becomes too steep. Accordingly, noise may be difficult to be absorbed over a broad frequency band.

Ringing can be successfully prevented or the impedance frequency characteristic can be successfully broadened by connecting a resistive element in series to the line. In recent years, capacitors have been required to have a resistive component. Attention has been paid to techniques of controlling the ESR of capacitors.

For example, Japanese Unexamined Domestic Patent Application Publication No. 2004-47983 and Japanese Unexamined PCT Patent Application Publication No. 2006/022258 disclose ways of controlling the ESR by including a resistive component in external terminal electrodes electrically connected to internal electrodes. In particular, Japanese Unexamined PCT Patent Application Publication No. 2006/022258 describes a monolithic ceramic capacitor including external terminal electrodes including a resistive component, which is formed by soaking a capacitor body in a resistive paste including a resistive material, such as an indium tin oxide (ITO), for example, and baking the resistive paste applied on the capacitor body.

When the external terminal electrodes include a resistive component, such as in Japanese Unexamined Domestic Patent Application Publication No. 2004-47983 and Japanese Unexamined PCT Patent Application Publication No. 2006/022258, the ESR of the capacitor can be controlled by adjusting the resistivity of the resistive material or by adjusting the thickness of the resistive paste that is applied.

It is troublesome to prepare a plurality of types of resistive pastes in order to adjust the resistivity of the resistive material. When the composition of a resistive paste is changed in order to adjust the resistivity, other factors, such as the reactivity with the internal electrodes or the fixing strength to the capacitor body, may be adversely affected.

In order to adjust the thickness of a resistive paste that is applied, the viscosity of the resistive paste must be adjusted.

In this case, the above-described other factors may be affected as a result of changing the composition of the resistive paste. A thick application of a resistive paste is technically limited, and thus, there is a limit to controlling the ESR to be increased.

SUMMARY OF THE INVENTION

To overcome the problems described above, preferred embodiments of the present invention provide a monolithic ceramic capacitor including external terminal electrodes including a resistive component and in which the ESR can be easily controlled.

According to preferred embodiments of the present invention, a monolithic ceramic capacitor is provided which includes a capacitor body that is a substantially rectangular parallelepiped, the capacitor body including a plurality of ceramic layers laminated on one another, the plurality of ceramic layers including first to third ceramic layers, the capacitor body having first and second main surfaces facing each other, first and second side surfaces facing each other, and first and second end surfaces facing each other.

In the interior of the capacitor body, a first internal electrode, a second internal electrode, and a third internal electrode are provided. The first internal electrode includes a capacitance portion arranged to form a capacitance and a lead-out portion lead out from the capacitance portion to the first end surface. The second internal electrode includes a capacitance portion arranged to form a capacitance and a lead-out portion lead out from the capacitance portion to the second end surface. The second internal electrode is electrically insulated from the first internal electrode via the first ceramic layer. The third internal electrode includes a capacitance portion arranged to form a capacitance and a lead-out portion lead out from the capacitance portion to the first end surface. The third internal electrode is electrically insulated from the second internal electrode via the second ceramic layer. The third internal electrode is located at a position different from that of the first internal electrode in a direction in which the ceramic layers are laminated.

On the first end surface of the capacitor body, a first external terminal electrode that is electrically connected to the first internal electrode and the third internal electrode is provided. On the second end surface of the capacitor body, a second external terminal electrode that is electrically connected to the second internal electrode is provided. The second internal electrode is connected to a potential that is different from a potential at the first external terminal electrode.

A size of the first end surface and the second end surface in a two-dimensional surface in which the ceramic layers extend is greater than a size of the first side surface and the second side surface in the two-dimensional surface in which the ceramic layers extend.

The first external terminal electrode and the second external terminal electrode include a resistive component.

The monolithic ceramic capacitor with the foregoing structure includes the following structure to overcome the foregoing problems.

That is, in each of the first internal electrode and the third internal electrode, a width-direction size of the lead-out portion measured in a direction substantially parallel to the first end surface is less than a width-direction size of the capacitance portion measured in the direction substantially parallel to the first end surface. The lead-out portion of the first internal electrode and the lead-out portion of the third internal electrode are arranged so as to partially overlap each other or not to overlap each other when viewed in the direction in which the ceramic layers are laminated.

In at least one of the first internal electrode and the third internal electrode, the width-direction size of the lead-out portion measured in the direction substantially parallel to the first end surface is preferably at least about 39% of the width-direction size of the capacitance portion measured in the direction substantially parallel to the first end surface, for example.

At least one of the first internal electrode and the third internal electrode may be substantially L-shaped in which one of two side edges of the lead-out portion in a direction in which the lead-out portion is lead out is substantially continuous with one of two side edges of the capacitance portion on a substantially straight line, or may be substantially T-shaped in which two side edges of the lead-out portion in a direction in which the lead-out portion is lead out are substantially not continuous with two side edges of the capacitance portion on substantially straight lines.

The first internal electrode and the third internal electrode may have shapes that are substantial mirror images of each other.

The monolithic ceramic capacitor may further include a fourth internal electrode provided in the interior of the capacitor body, the fourth internal electrode including a capacitance portion arranged to form a capacitance and a lead-out portion lead out from the capacitance portion to the second end surface, the fourth internal electrode being electrically insulated from the third internal electrode via the third ceramic layer, the fourth internal electrode being arranged at a position different from that of the second internal electrode in the direction in which the ceramic layers are laminated, the fourth internal electrode being electrically connected to the second external terminal electrode.

In this case, in each of the second internal electrode and the fourth internal electrode, a width-direction size of the lead-out portion measured in a direction substantially parallel to the second end surface may be less than a width-direction size of the capacitance portion measured in the direction substantially parallel to the second end surface. The lead-out portion of the second internal electrode and the lead-out portion of the fourth internal electrode may be arranged so as to partially overlap each other or not to overlap each other when viewed in the direction in which the ceramic layers are laminated.

In at least one of the second internal electrode and the fourth internal electrode, the width-direction size of the lead-out portion measured in the direction substantially parallel to the second end surface is preferably at least about 39% of the width-direction size of the capacitance portion measured in the direction substantially parallel to the second end surface, for example.

At least one of the second internal electrode and the fourth internal electrode may be substantially L-shaped in which one of two side edges of the lead-out portion in a direction in which the lead-out portion is lead out is substantially continuous with one of two side edges of the capacitance portion on a substantially straight line, or may be substantially T-shaped in which two side edges of the lead-out portion in a direction in which the lead-out portion is lead out are substantially not continuous with two side edges of the capacitance portion on substantially straight lines.

The second internal electrode and the fourth internal electrode may have shapes that are substantial mirror images of each other.

The first internal electrode and the second internal electrode may have substantially the same shape, and the third internal electrode and the fourth internal electrode may have substantially the same shape. Alternatively, the first internal electrode and the fourth internal electrode may have substantially the same shape, and the second internal electrode and the third internal electrode may have substantially the same shape.

The resistive component included in the first external terminal electrode and the second external terminal electrode preferably includes a metal oxide.

According to the preferred embodiments of the present invention, the ESR can be increased since the width-direction size of the lead-out portion of each of the first internal electrode and the third internal electrode is less than the width-direction size of the capacitance portion.

According to the preferred embodiments of the present invention, not only the width-direction size of the lead-out portion is less, as has been described above, the lead-out portion of the first internal electrode and the lead-out portion of the third internal electrode, which have substantially the same potential as the first internal electrode, are displaced relative to each other so as to partially overlap each other or not to overlap each other. Thus, the periphery of a region at which exposed portions of the internal electrodes are distributed can be made wider when viewed from the first end surface. Accordingly, the arrangement of the periphery is similar to the arrangement of the periphery of a region at which exposed portions of internal electrodes of a known LW-inverted monolithic ceramic capacitor are distributed. In a radio frequency (RF) band, due to the skin effect, electric fields are concentrated in the periphery. When the peripheries of regions at which exposed portions of the internal electrodes are distributed have similar arrangements, current paths are also equivalent. Accordingly, the ESL in the preferred embodiments of the present invention can be reduced to a level similar to that in the known LW-inverted monolithic ceramic capacitor.

According to the monolithic ceramic capacitor of the preferred embodiments of the present invention, the ESR can be increased, while the ESL can be maintained at a level similar to that in the known LW-inverted monolithic ceramic capacitor. The ESR control is easier to perform than the adjustment of the composition or thickness of a resistive paste to be applied and has a better ESR increasing effect.

Since the width-direction size of the lead-out portion preferably is at least about 39% of the width-direction size of the capacitance portion, for example, the ESL is prevented from becoming too high.

When each of the internal electrodes is substantially L-shaped in which one of two side edges of the lead-out portion is substantially continuous with one of two side edges of the capacitance portion on a substantially straight line, the side edge of the lead-out portion can easily be arranged closer to one of the side surfaces of the capacitor body. Since the external terminal electrodes become thinner as they get closer to the side surfaces of the capacitor body, the distance from the side edge of the lead-out portion connected to the inner surface of a corresponding one of the external terminal electrodes to the outer surface of the external terminal electrodes can be reduced, and the, the ESL can be reduced.

Alternatively, when each of the internal electrodes is substantially T-shaped in which two side edges of the lead-out portion are substantially not continuous with two side edges of the capacitance portion on substantially straight lines, the lead-out portion can be arranged closer to the center between two side surfaces. As a result, the distance from the lead-out portion to the outer surface of a corresponding one of the external terminal electrodes is increased, and thus, the ESR can be further increased.

When the first internal electrode and the third internal electrode have shapes that are substantial mirror images of each other, the laminated state of the capacitor body can be stabilized.

When the monolithic ceramic capacitor according to the preferred embodiments of the present invention further includes the fourth internal electrode and the fourth internal electrode has a relationship with the second internal electrode similar to the relationship between the first internal electrode and the third internal electrode, the advantages obtained by the first internal electrode and the third internal electrode are substantially doubled.

Other features, elements, characteristics, and advantages of the present invention will become more apparent from the following detailed description of preferred embodiments of the present invention with reference to the attached drawings.

BRIEF DESCRIPTION OF THE DRAWINGS

FIGS. 3A to 3D illustrate cross sections of four internal electrodes of the monolithic ceramic capacitor shown in FIG. 1.

FIG. 7 is a sectional view of an enlarged portion of the second external terminal electrode included in the monolithic ceramic capacitor shown in FIG. 1.

FIGS. 8A to 8D correspond to FIGS. 3A to 3D and illustrate a second preferred embodiment of the present invention.

DETAILED DESCRIPTION OF PREFERRED EMBODIMENTS

Figure 1:
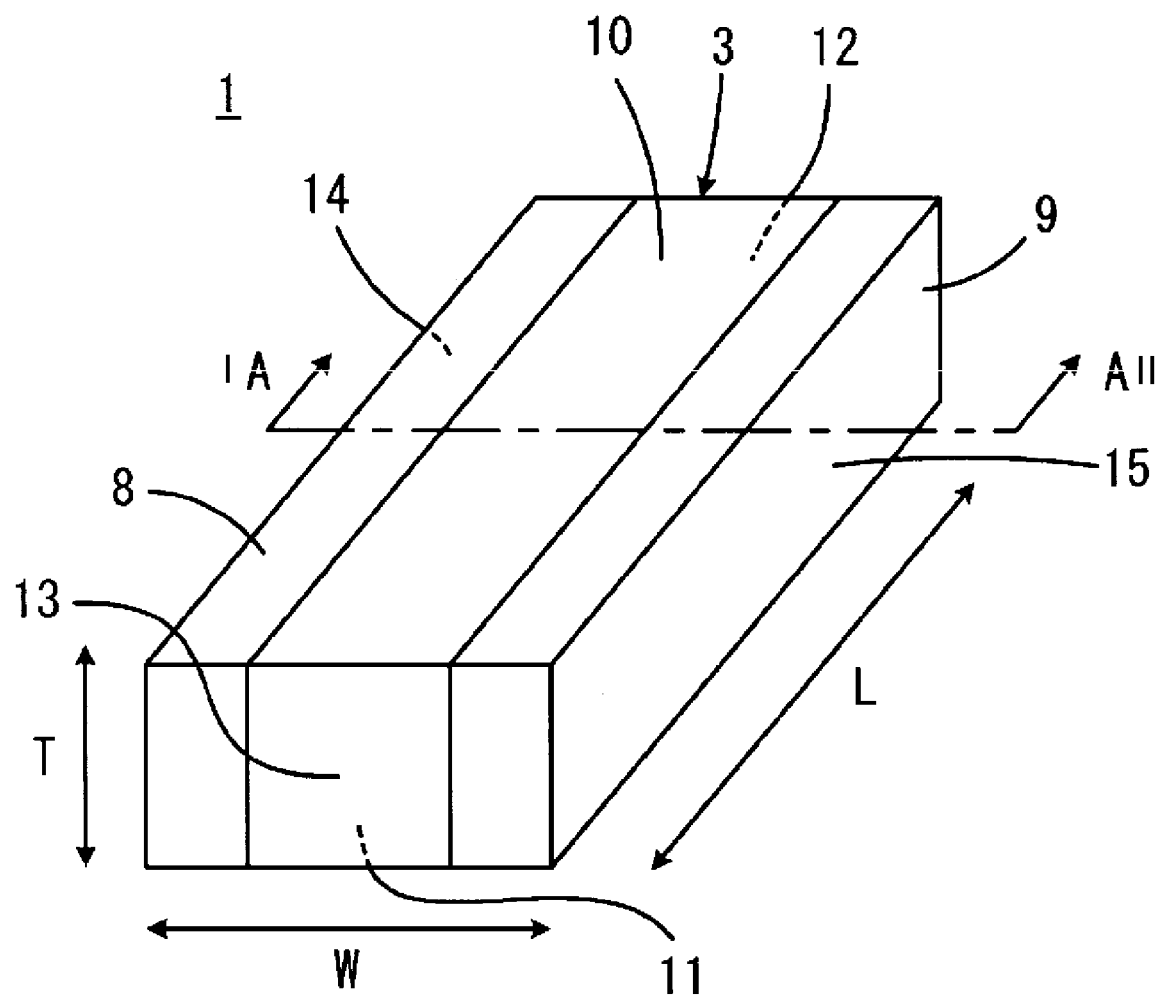
FIG. 1 is a perspective view showing the appearance of a monolithic ceramic capacitor according to a first preferred embodiment of the present invention.
Figure 2:
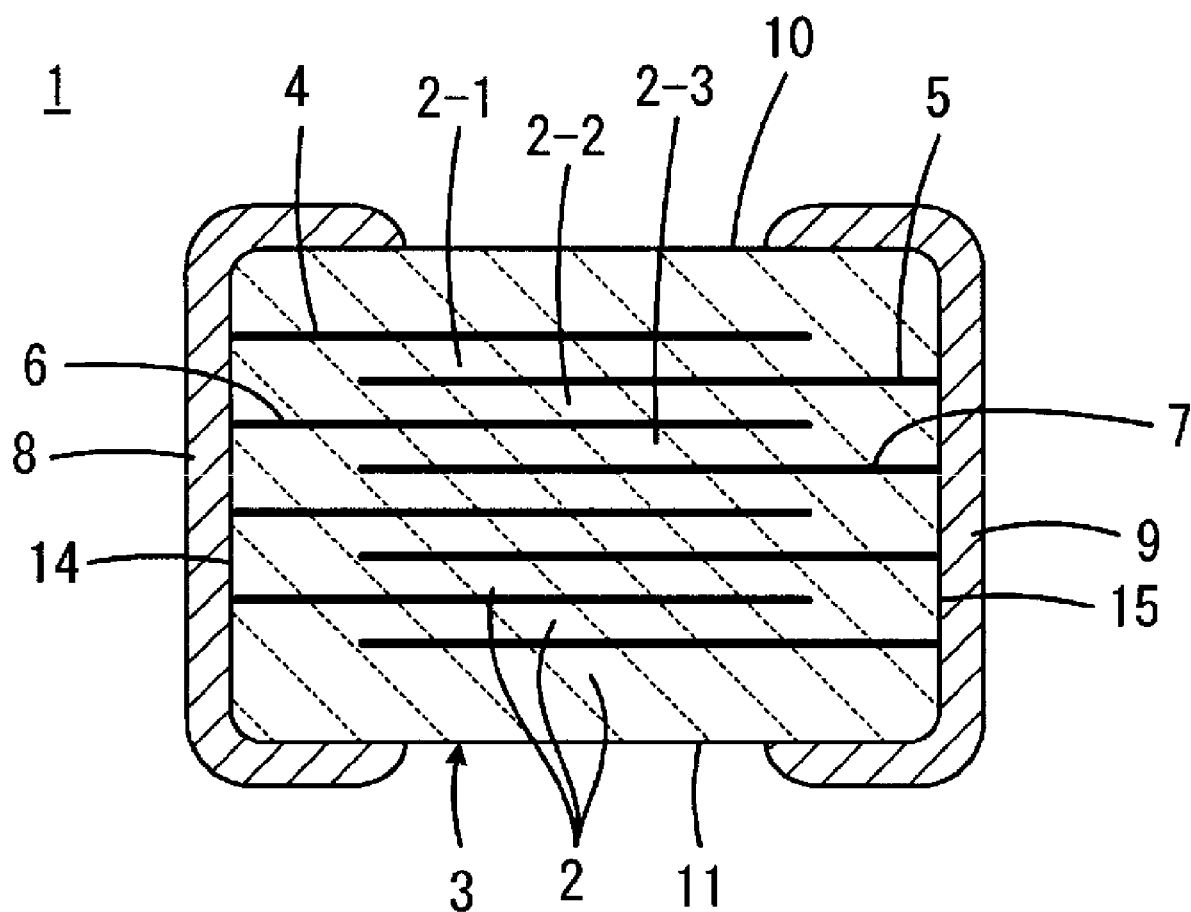
FIG. 2 is a sectional view of the monolithic ceramic capacitor taken along the line II-II of FIG. 1.

Referring to FIGS. 1 to 7, a first preferred embodiment of the present invention is described. FIG. 1 is a perspective view showing a monolithic ceramic capacitor 1 according to the first preferred embodiment. FIG. 2 is a sectional view of the monolithic ceramic capacitor 1 taken along the line II-II of FIG. 1.

The monolithic ceramic capacitor 1 includes a capacitor body 3 including a plurality of ceramic layers 2 that are laminated on one another, including a first ceramic layer 2-1, a second ceramic layer 2-2, and a third ceramic layer 2-3, first to fourth internal electrodes 4 to 7 provided in the interior of the capacitor body 3, and first and second external terminal electrodes 8 and 9 arranged to face each other on external surfaces of the capacitor body 3.

In the following description, when it is unnecessary to distinguish the first ceramic layer 2-1, the second ceramic layer 2-2, and the third ceramic layer 2-3 from one another, the reference numeral "2" is used to collectively denote the ceramic layers.

In the capacitor body 3, the ceramic layers 2 are formed of a dielectric ceramic which preferably primarily includes, for example, $BaTiO_3$, $CaTiO_3$, $SrTiO_3$, or $CaZrO_3$. Besides the foregoing primary component, the ceramic layers 2 may include an additional component such as a Mn compound, an Fe compound, a Cr compound, a Co compound, or a Ni compound, for example. It is preferable that the thickness of the ceramic layers 2 be within the range of about 1 μm to about 10 μm, for example.

The capacitor body 3 preferably is a substantially rectangular parallelepiped including first and second main surfaces 10 and 11 facing each other, first and second side surfaces 12 and 13 facing each other, and first and second end surfaces 14 and 15 facing each other.

In the capacitor body 3, the size of the first end surface 14 and the second end surface 15 in a two-dimensional surface in which the ceramic layers 2 extend, that is, the length of the capacitor body 3 is greater than the size of the first side surface 12 and the second side surface 13 in the two-dimensional surface in which the ceramic layers 2 extend, that is, the width of the capacitor body 3. It is preferable that the length be about 1.5 times to about 2.5 times as long as the width, for example. The first and second external terminal electrodes 8 and 9 are provided on the first and second end surfaces 14 and 15, respectively.

In the interior of the capacitor body 3, the second internal electrode 5 is electrically insulated from the first internal electrode 4 via the first ceramic layer 2-1. The third internal electrode 6 is electrically insulated from the second internal electrode 5 via the second ceramic layer 2-2. The third internal electrode 6 is located at a position different from that of the first internal electrode 4 in a direction in which the ceramic layers 2 are laminated. The fourth internal electrode 7 is electrically insulated from the third internal electrode 6 via the third ceramic layer 2-3. The fourth internal electrode 7 is located at a position different from that of the second internal electrode 5 in the direction in which the ceramic layers 2 are laminated.

FIGS. 3A to 3D illustrate cross sections of the first to fourth internal electrodes 4 to 7 of the monolithic ceramic capacitor 1.

Referring to FIGS. 3A to 3D, each of the first to fourth internal electrodes 4 to 7 includes a capacitance portion 16 arranged to form a capacitance and a lead-out portion 17 lead out from the capacitance portion 16 to the first end surface 14 or the second end surface 15. In the first internal electrode 4, as shown in FIG. 3A, the width-direction size L2 of the lead-out portion 17 measured in a direction substantially parallel to the first or second end surface 14 or 15 is less than the width-direction size L1 of the capacitance portion 16 measured in the direction substantially parallel to the first or second end surface 14 or 15.

The lead-out portion 17 of the first internal electrode 4 and the lead-out portion 17 of the third internal electrode 6 are arranged so as to partially overlap each other when viewed in the direction in which the ceramic layers 2 are laminated. At the same time, the lead-out portion 17 of the second internal electrode 5 and the lead-out portion 17 of the fourth internal electrode 7 are arranged so as to partially overlap each other when viewed in the direction in which the ceramic layers 2 are laminated.

In each of the first to fourth internal electrodes 4 to 7, the width-direction size L2 of the lead-out portion 17 is preferably at least about 39% of the width-direction size L1 of the capacitance portion 16, for example. When the width-direction size L2 is less than about 39% of the width-direction size L1, the ESL of the monolithic ceramic capacitor 1 may become too high.

Each of the first to fourth internal electrodes 4 to 7 is substantially L-shaped in which one of two side edges of the lead-out portion 17 in a direction in which the lead-out portion 17 is lead out is substantially continuous with one of two side edges of the capacitance portion 16 on a substantially straight line. As a result, the side edge of the lead-out portion 17 can be easily arranged closer to the side surface 12 or 13 of the capacitor body 3. From the viewpoint of the ESL, it is preferable that one of the two side edges of the lead-out portion 17 be closer to the side surface 12 or 13 of the capacitor body 3, which will be described in more detail below.

The first internal electrode 4 and the third internal electrode 6 have shapes that are substantially mirror images of each other. The second internal electrode 5 and the fourth internal electrode 7 have shapes that are substantially mirror images of each other. With the foregoing structure, the laminated state of the capacitor body 3 becomes stable.

The first internal electrode 4 and the second internal electrode 5 have substantially the same shape. The third internal electrode 6 and the fourth internal electrode 7 have substantially the same shape. Accordingly, the number of patterns of printing plates used to print the conductive pastes that are to become the internal electrodes 4 to 7 can be reduced. Ceramic green sheets that are to become the ceramic layers 2 after being fired are laminated by rotating the ceramic green sheets on which conductive paste films having the same shape are printed so that the ceramic green sheets are displaced from one another by a predetermined distance in the XY direction and then laminating the displaced ceramic green sheets. It thus becomes unnecessary to prepare many different types of ceramic green sheets, and the mass production efficiency is improved.

A conductive component included in the internal electrodes 4 to 7 includes, for example, Ni, Cu, Ag, Pd, an Ag—Pd alloy, or Au. It is preferable that the thickness of each of the internal electrodes 4 to 7 be within the range of about 1 μm to about 10 μm, for example.

Figure 4A:
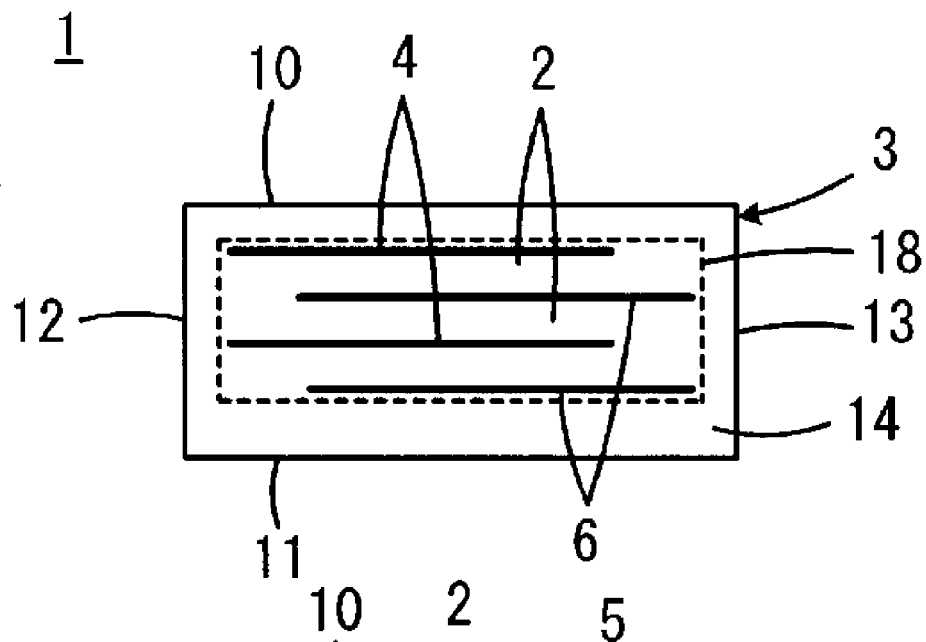
FIGS. 4A and 4B illustrate first and second end surfaces of a capacitor body of the monolithic ceramic capacitor shown in FIG. 1 before first and second external terminal electrodes are provided.
Figure 4B:
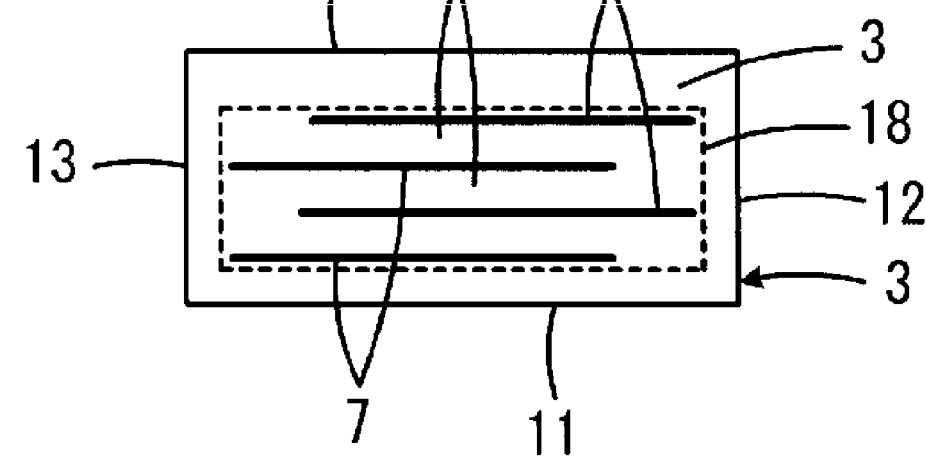
Figure 5A:
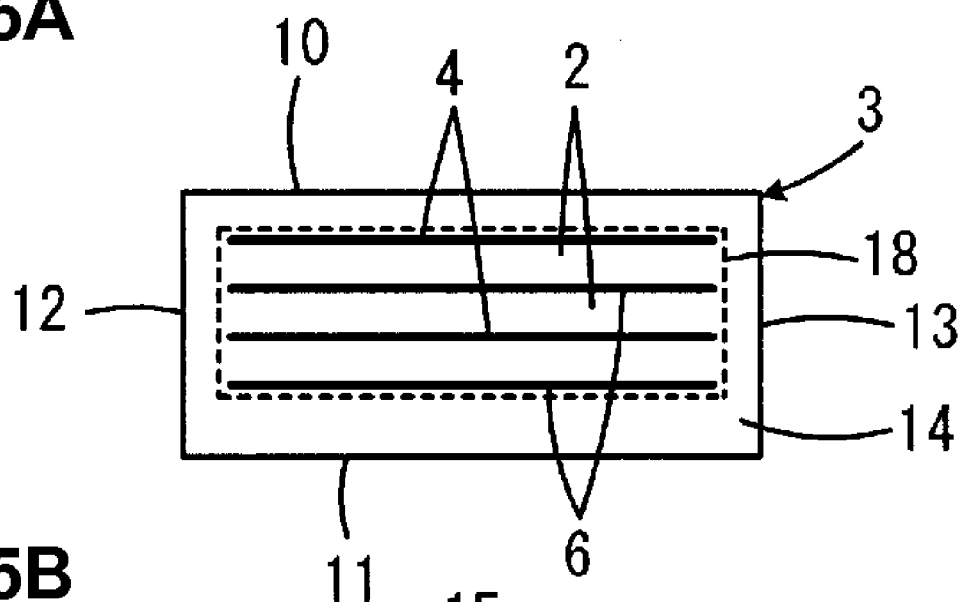
FIGS. 5A and 5B illustrate a first comparative example where FIG. 5A corresponds to FIG. 4A and FIG. 5B corresponds to FIG. 3A.
Figure 5B:
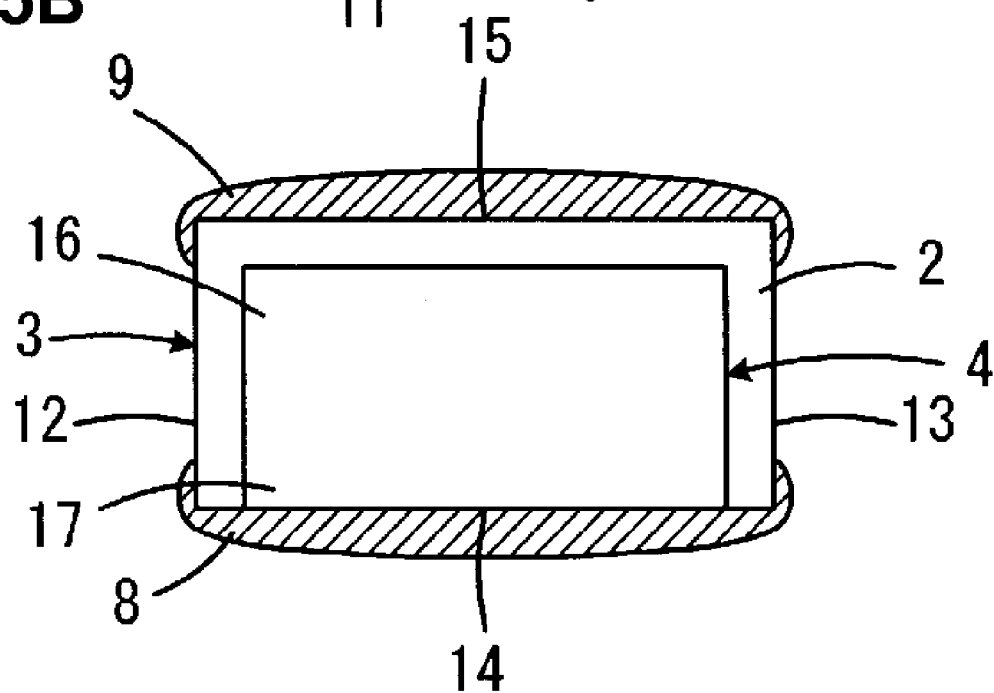
Figure 6A:
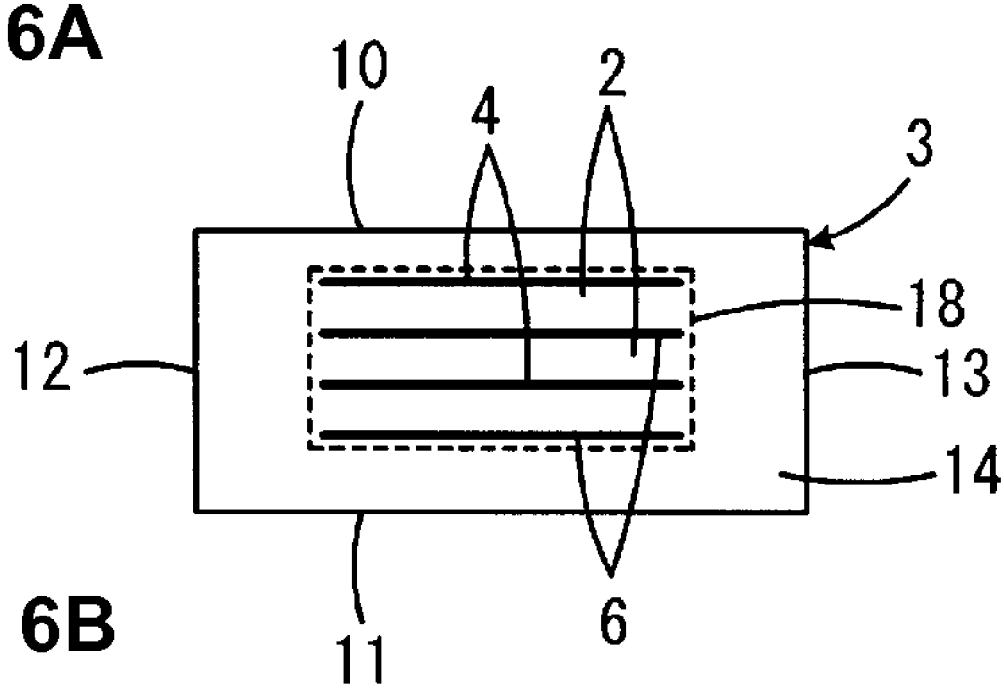
FIGS. 6A and 6B illustrate a second comparative example where FIG. 6A corresponds to FIG. 4A and FIG. 6B corresponds to FIG. 3A.
Figure 6B:
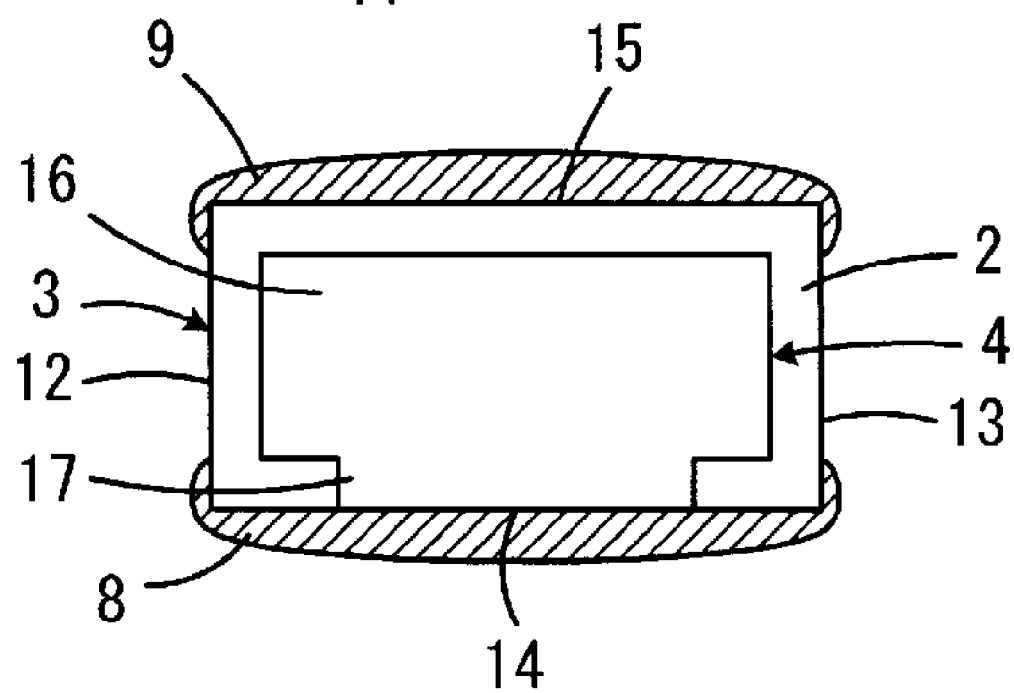
Figure 9A:
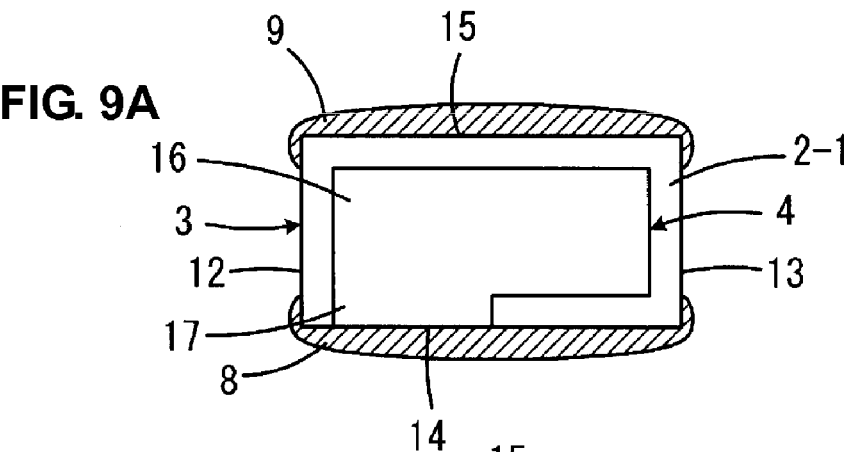
FIGS. 9A to 9D correspond to FIGS. 3A to 3D and illustrate a third preferred embodiment of the present invention.
Figure 9B:
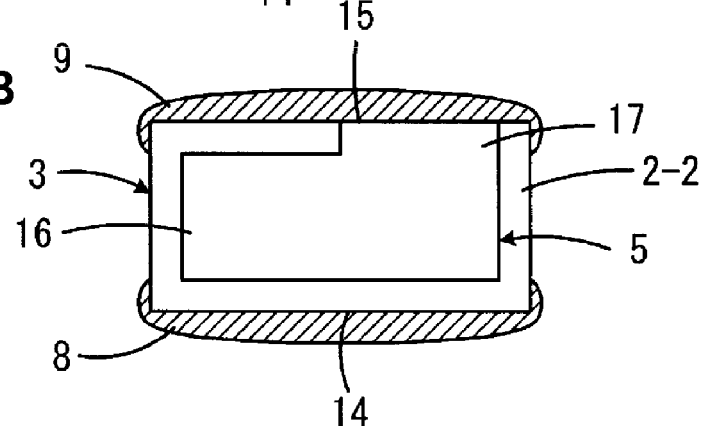
Figure 9C:
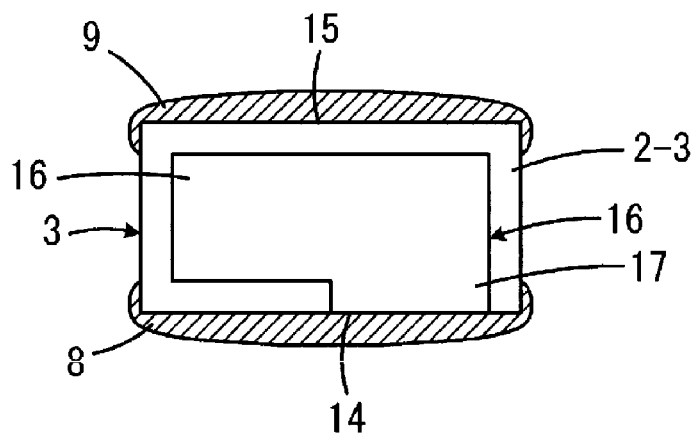
Figure 9D:
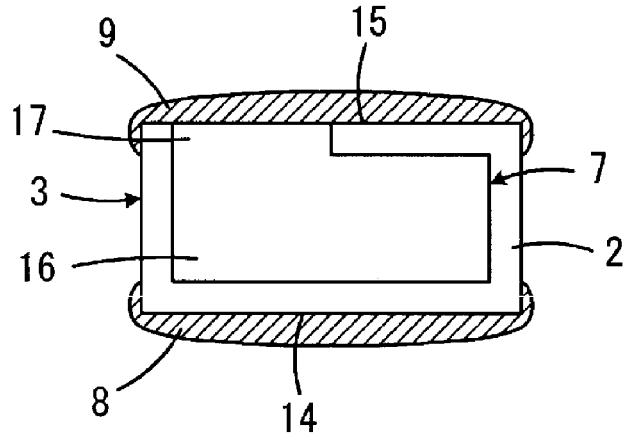

FIGS. 4A and 4B are respective end views of the first and second end surfaces 14 and 15 of the capacitor body 3 before the first and second external terminal electrodes 8 and 9 are formed. In contrast, FIGS. 5A and 5B illustrate a first comparative example, and FIGS. 6A and 6B illustrate a second comparative example. FIGS. 5A and 6A correspond to FIG. 4A, and FIGS. 5B and 6B correspond to FIG. 3A. In FIGS. 5A, 5B, 6A, and 6B, elements corresponding to those shown in FIGS. 3A to 3D, 4A, and 4B are denoted by the same reference numerals, and repeated descriptions thereof are omitted.

FIGS. 5A and 5B illustrate a known LW-inverted monolithic ceramic capacitor. In this monolithic ceramic capacitor, the width-direction size of the lead-out portion 17 of the internal electrode 4 is substantially the same as the width-direction size of the capacitance portion 16.

FIGS. 6A and 6B illustrate a monolithic ceramic capacitor in which the width-direction size of the lead-out portion 17 of the internal electrode 4 is less than the width-direction size of the capacitance portion 16, and the lead-out portion 17 of the first internal electrode 4 and the lead-out portion 17 of the third internal electrode 6 are arranged so as to completely overlap each other when viewed in the direction in which the ceramic layers 2 are laminated. In this monolithic ceramic capacitor, although not shown in FIGS. 6A and 6B, the lead-out portion 17 of the second internal electrode 5 and the lead-out portion 17 of the fourth internal electrode 7 are arranged so as to completely overlap each other when viewed in the direction in which the ceramic layers 2 are laminated.

In FIGS. 4A, 5A, and 6A, a periphery 18 of a region at which exposed portions of the first internal electrode 4 and the third internal electrode 6 are distributed is represented by broken lines. In FIG. 4B, the periphery 18 of a region at which exposed portions of the second internal electrode 5 and the fourth internal electrode 7 are distributed is represented by broken lines. In FIGS. 4A, 4B, 5A, and 6A, the thickness and the number of the ceramic layers 2 and the internal electrodes 4 to 7 are shown in a deformed manner. In the actual structure, the distance between the internal electrodes 4 to 7 is significantly less.

As is clear from the comparison between FIG. 4A and FIG. 5A, the arrangement of the periphery 18 of the region at which the exposed portions of the internal electrodes 4 and 6 are distributed is similar to that of the periphery 18 of the region at which the exposed portions of the internal electrodes 4 and 6 of the known LW-inverted monolithic ceramic capacitor are distributed, although these peripheries 18 are not exactly the same. It is clear that the former is wider than the periphery 18 in which the lead-out portions 17 are located so as to completely overlap each other, as in the monolithic ceramic capacitor shown in FIGS. 6A and 6B.

In a radio frequency (RF) band in which a decoupling capacitor is used, due to the skin effect, electric fields are concentrated in the periphery of conductors. That is, when the peripheries of regions at which exposed portions of the internal electrodes are distributed have similar arrangements, the electric-field concentration modes are also similar. According to the monolithic ceramic capacitor 1 of the first preferred embodiment, the ESL can be reduced to a level similar to that in the known LW-inverted monolithic ceramic capacitor.

Since the width-direction size L2 of the lead-out portion 17 is less than the width-direction size L1 of the capacitance portion 16 in the monolithic ceramic capacitor 1 of the first preferred embodiment, the ESR is higher than that in the known LW-inverted monolithic ceramic capacitor. That is, according to the monolithic ceramic capacitor 1 of the first preferred embodiment, the ESR can be increased while the ESL is maintained at a low level.

In the monolithic ceramic capacitor having the structure shown in FIGS. 6A and 6B, even when the ESR is increased, the ESL is also increased. Thus, a desired low-ESL and high-ESR monolithic ceramic capacitor cannot be achieved.

The first and second external terminal electrodes 8 and 9 preferably include a resistive component. The resistive component refers to a component with relatively high resistivity excluding metals and glass included in typical external terminal electrodes. More specifically, the resistive component preferably includes a metal oxide excluding glass, graphitic carbon, or other materials. Preferably, the metal oxide includes, for example, $RuO_2$, an In—Sn compound oxide (ITO), a La—Cu compound oxide, a Sr—Fe compound oxide, a Ca—Sr—Ru compound oxide, or other suitable materials.

FIG. 7 is a sectional view of an enlarged portion of the second external terminal electrode 9 included in the monolithic ceramic capacitor 1 according to the first preferred embodiment. Although the first external terminal electrode 8 is not shown in FIG. 7, the first external terminal electrode 8 preferably has substantially the same structure as that of the second external terminal electrode 9.

The second external terminal electrode 9 includes a first layer 19 disposed on the second end surface 15 of the capacitor body 3, a second layer 20 disposed on the first layer 19, a third layer 21 disposed on the second layer 20, and a fourth layer 22 disposed on the third layer 21.

The first layer 19 primarily includes a resistive component. The first layer 19 is formed by applying a resistive paste including a resistive component to the second end surface 15 and baking the resistive paste. Since the first layer 19 is formed, the resistive component is connected in series to the capacitance of the monolithic ceramic capacitor 1, thereby increasing the ESR of the monolithic ceramic capacitor 1.

Examples of materials that can be used as the resistive component are described above. When the first layer 19 includes the resistive component while the internal electrode 5 includes Ni or a Ni alloy, as in the first preferred embodiment, it is preferable to use an In—Sn compound oxide (ITO), a La—Cu compound oxide, a Sr—Fe compound oxide, or a Ca—Sr—Ru compound oxide, for example, as the resistive component. These compound oxides have good reactivity with Ni, and thus, the bonding between the internal electrodes 4 to 7 and the external terminal electrodes 8 and 9 can be maintained in an excellent state.

It is preferable that glass be added to the first layer 19. Glass includes, for example, B—Si glass, B—Si—Zn glass, B—Si—Zn—Ba glass, B—Si—Zn—Ba—Ca—Al glass, or other suitable glass. When glass is added to the first layer 19, the volume ratio between the resistive component and the glass preferably ranges from about 30:70 to about 70:30, for example.

A metal, such as Ni, Cu, Mo, Cr, or Nb, for example, may be added to the first layer 19. A metal oxide, such as $Al_2O_3$, $TiO_2$, $ZrO_2$, or $ZnO_2$, for example, may be added to the first layer 19. These materials have the function of adjusting the resistivity provided by the first layer 19 and the function of adjusting the compactness. That is, when the foregoing metal is added to the first layer 19, the resistivity decreases. When the foregoing metal oxide is added to the first layer 19, the resistivity increases. In addition, Ni, Cu, $Al_2O_3$, and $TiO_2$, for example, promote the compactness of the first layer 19, whereas Mo, Cr, Nb, $ZrO_2$, and $ZnO_2$, for example, suppress the compactness of the first layer 19. Compactness suppression has the effect of preventing blistering due to excessive sintering of the first layer 19.

It is preferable that the thickness of the thickest portion of the first layer 19 be within the range of about 20 μm to about 30 μm, for example.

Next, the second layer 20 primarily includes a metal. The second layer 20 is formed by applying a conductive paste including a metal powder to the first layer 19 and baking the conductive paste. Although the second layer 20 may be omitted and the third layer 21, which will be described later, can be directly formed on the first layer 19, the moisture resistance and the plating of the first layer 19 can be improved by forming the second layer 20.

The metal included in the second layer 20 includes, for example, Cu, Ni, Ag, Pd, an Ag—Pd alloy, Au, or other suitable metal. It is preferable that glass be added to the second layer 20. Preferably, the same glass as that included in the first layer 19 or glass that has the same main component as that of the glass included in the first layer 19 be used as the glass added to the second layer 20.

It is preferable that the thickness of the thickest portion of the second layer 20 be within the range of about 30 μm to about 40 μm, for example.

The third layer 21 and the fourth layer 22 are formed by plating. When the monolithic ceramic capacitor 1 is to be mounted using soldering, it is preferable that the third layer 21 be formed by Ni plating, for example, and the fourth layer 22 be formed by Sn plating, for example. Alternatively, when the monolithic ceramic capacitor 1 is to be mounted using a conductive adhesive or wire bonding, it is preferable that the third layer 21 be formed by Ni plating, for example, and the fourth layer 22 be formed by Au plating, for example. Alternatively, when the monolithic ceramic capacitor 1 is to be embedded in a resin substrate, it is preferable that the fourth layer 22, which defines the outermost layer, be formed by Cu plating, for example.

It is preferable that the thickness of each of the third layer 21 and the fourth layer 22 be within the range of about 1 μm to about 10 μm, for example. Layers that are formed by plating need not be the foregoing two layers, namely, the third layer 21 and the fourth layer 22. Alternatively, only a single layer or three or more layers may be formed by plating. A resin layer for reducing stress may be formed between the second layer 20 and the third layer 21.

Next, an exemplary method of manufacturing the foregoing monolithic ceramic capacitor 1 will be described.

First, ceramic green sheets that are to become the ceramic layers 2, conductive pastes that are to become the internal electrodes 4 to 7, and resistive pastes and conductive pastes that are to become the external terminal electrodes 8 and 9 are prepared. The ceramic green sheets and the conductive and resistive pastes include binders and solvents. Known organic binders and known organic solvents can be used as the binders and solvents.

Next, conductive pastes with predetermined patterns are printed on the ceramic green sheets using, for example, a screen printing method. Accordingly, the ceramic green sheets on which conductive paste films that are to become the internal electrodes 4 to 7 are formed are obtained.

Next, a predetermined number of the ceramic green sheets on which the conductive paste films are formed in the foregoing manner are laminated in a predetermined order. On the top and bottom surfaces of this laminated structure, a predetermined number of outer-layer ceramic green sheets on which no conductive paste films are formed are laminated, thereby obtaining a mother laminated structure in a raw state. If necessary, this raw mother laminated structure is crimped using isostatic pressing or other suitable method in a laminated direction.

Next, the raw mother laminated structure is cut into pieces of a predetermined size, thereby obtaining capacitor main bodies 3 in a raw state. Hereinafter, one of the capacitor main bodies 3 will be described.

Next, the raw capacitor body 3 is fired. The firing temperature depends on the ceramic material included in the ceramic green sheets and the metal material included in the conductive pastes. It is preferable that the firing temperature be selected from the range of, for example, about 900° C. to about 1300° C.

Next, a resistive paste is applied onto each of the first and second end surfaces 14 and 15 of the fired capacitor body 3, and the resistive paste is baked, thereby forming the first layer 19 of the external terminal electrodes 8 and 9. It is preferable that the baking temperature be within the range of about 700° C. to about 900° C., for example. The resistive paste is baked in an atmosphere of air, $N_2$, or other suitable according to the resistive components of the resistive paste.

Next, a conductive paste is applied onto the first layer 19, and the conductive paste is baked, thereby forming the second layer 20. It is preferable that the baking temperature be within the range of about 700° C. to about 900° C., for example. It is also preferable that this baking temperature be less than that used to form the first layer 19. The conductive paste is baked in an atmosphere of air, $N_2$, or other suitable gas according to the metal components of the conductive paste.

Next, the third layer 21 is formed on the second layer 20 by plating, and the fourth layer 22 is formed on the third layer 21 by plating, thereby completing the monolithic ceramic capacitor 1.

Other preferred embodiments of the present invention will now be described below with reference to FIGS. 8A to 13D. Monolithic ceramic capacitors according to the other preferred embodiments have appearances that are similar to the appearance of the monolithic ceramic capacitor 1 according to the first preferred embodiment shown in FIG. 1. FIGS. 8A to 13D correspond to FIGS. 3A to 3D. In FIGS. 8A to 13D, elements corresponding to those shown in FIGS. 3A to 3D are denoted by the same reference numerals, and repeated descriptions thereof are omitted.

According to a second preferred embodiment shown in FIGS. 8A to 8D, the lead-out portions 17 of the internal electrodes 4 to 7 are arranged so as not to overlap each other at all when viewed in the direction in which the ceramic layers 2 are laminated. According to the second preferred embodiment, the areas at which the ceramic layers 2 are bonded together increase, and thus, the bonding between the ceramic layers 2 can be improved.

According to a third preferred embodiment shown in FIGS. 9A to 9D, the lead-out portions 17 of the internal electrodes 4 to 7 are arranged not only not to overlap each other, but also to compensate for one another, that is, to cover missing portions of the lead-out portions 17, when viewed in the direction in which the ceramic layers 2 are laminated. In other words, in terms of the relationship between the width-direction sizes L1 and L2 shown in FIG. 3A, the width-direction size L2 is about 50% of the width-direction size L1, for example. According to the third preferred embodiment, unevenness due to the lead-out portions 17 is prevented from occurring, and the laminated state of the capacitor body 3 is thus made stable.

According to a fourth preferred embodiment shown in FIGS. 10A to 10D, each of the internal electrodes 4 to 7 preferably is substantially T-shaped in which two side edges of the lead-out portion 17 in the direction in which the lead-out portion 17 is lead out are not substantially continuous with two side edges of the capacitance portion 16 along substantially straight lines.

Figure 10A:
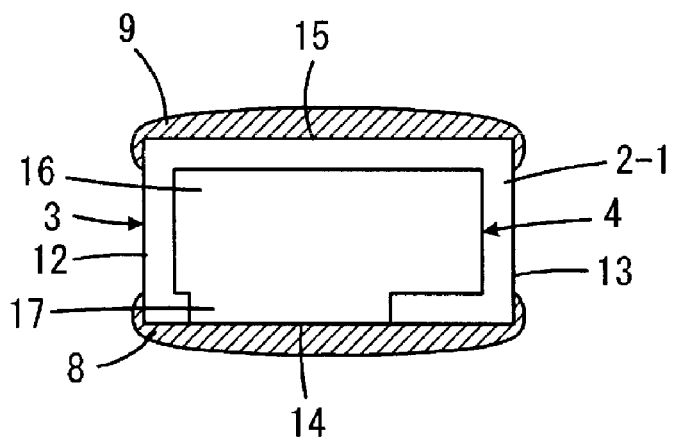
FIGS. 10A to 10D correspond to FIGS. 3A to 3D and illustrate a fourth preferred embodiment of the present invention.
Figure 10B:
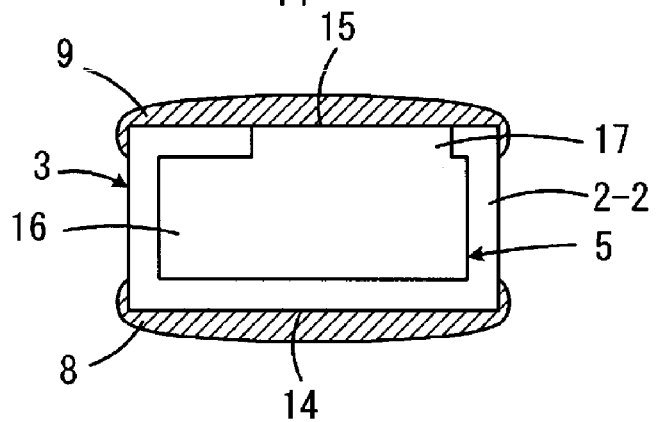
Figure 10C:
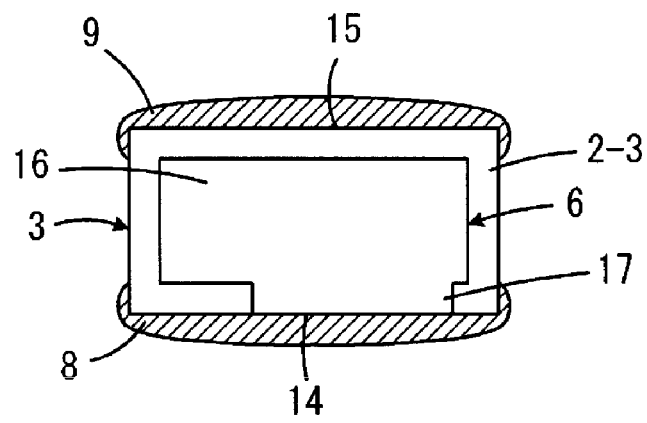
Figure 10D:
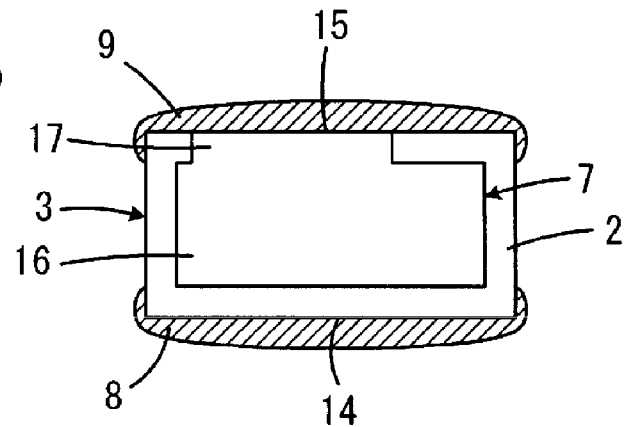
Figure 11:
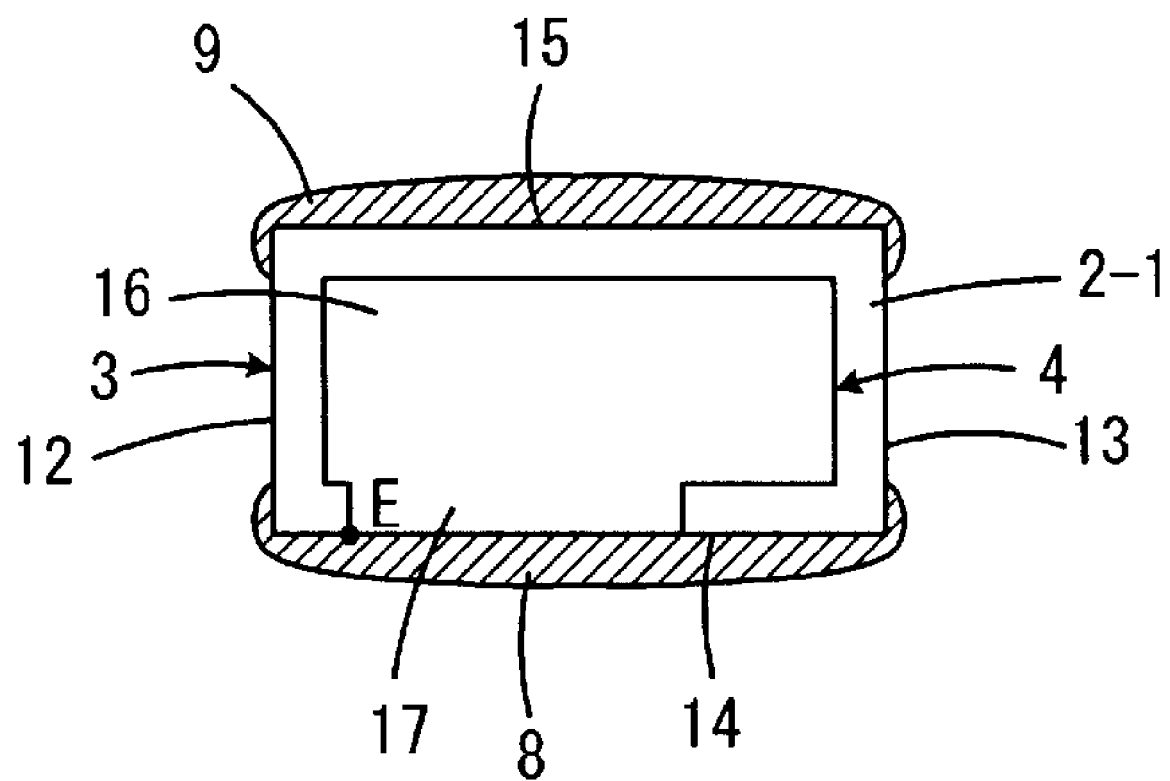
FIG. 11 corresponds to FIG. 10A and illustrates the position of a lead-out portion.
Figure 12A:
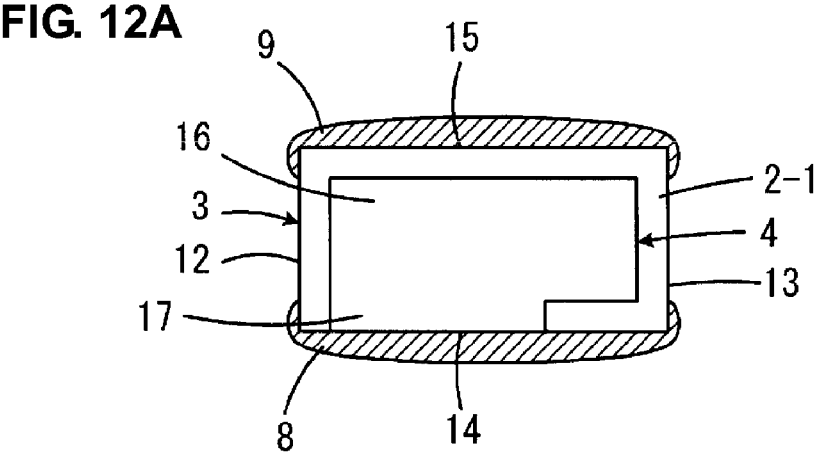
FIGS. 12A to 12D correspond to FIGS. 3A to 3D and illustrate a fifth preferred embodiment of the present invention.
Figure 12B:
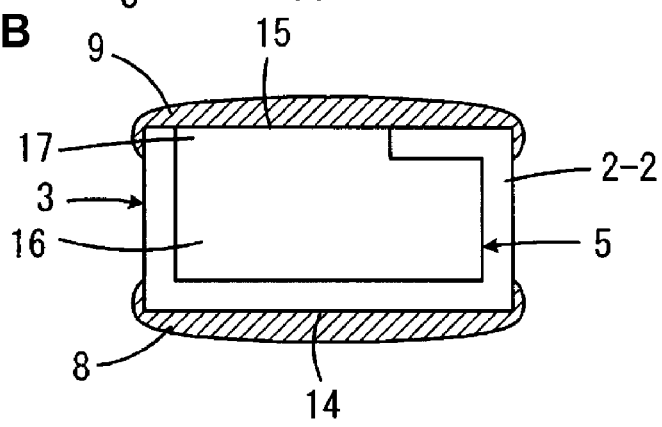
Figure 12C:
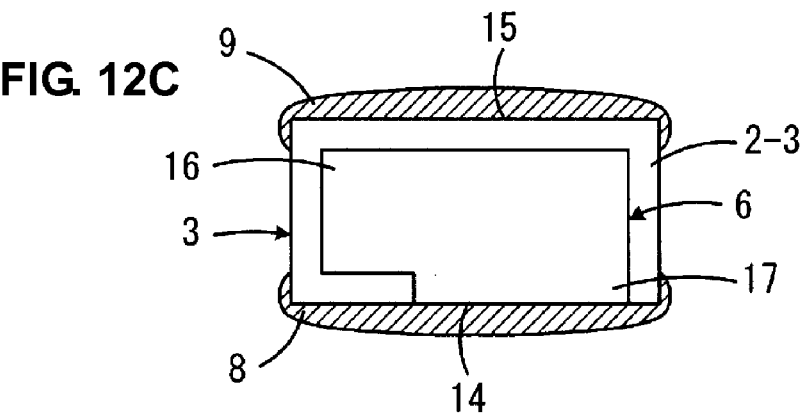
Figure 12D:
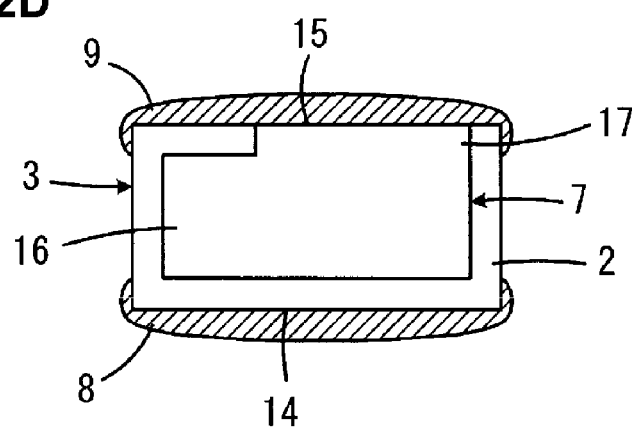
Figure 13A:
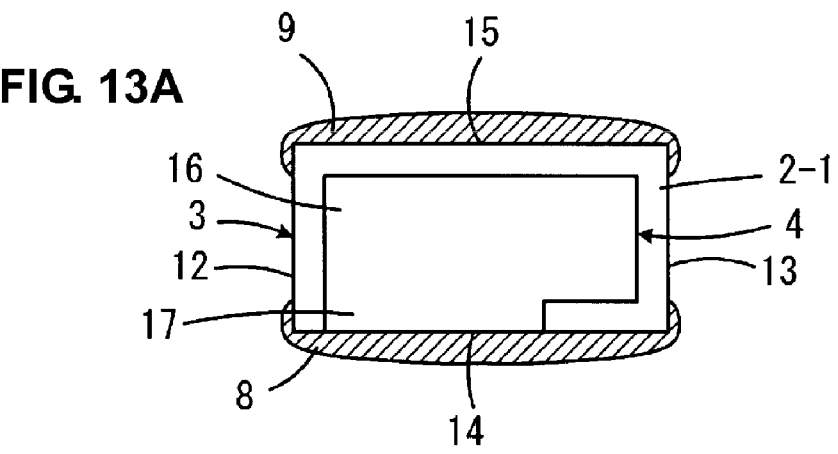
FIGS. 13A to 13D correspond to FIGS. 3A to 3D and illustrate a sixth preferred embodiment of the present invention.
Figure 13B:
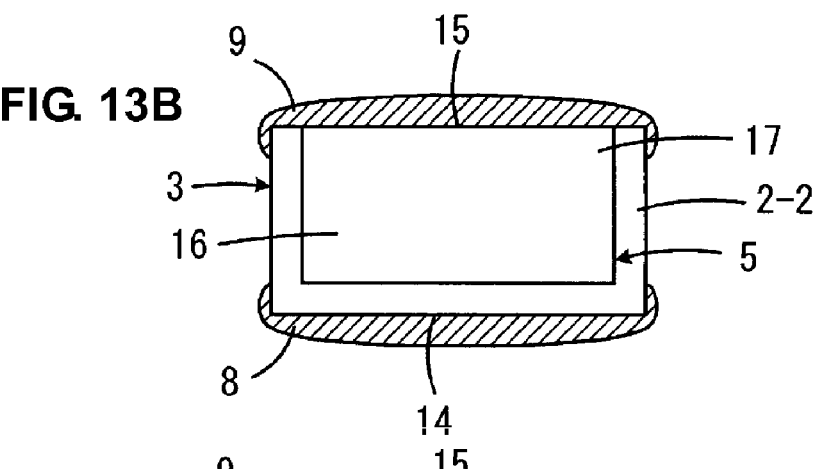
Figure 13C:
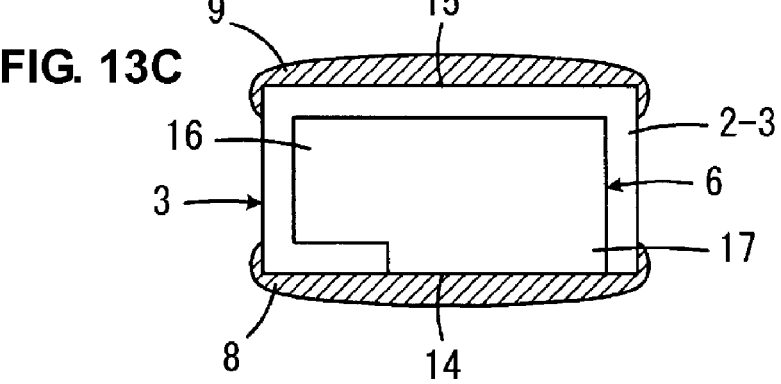
Figure 13D:
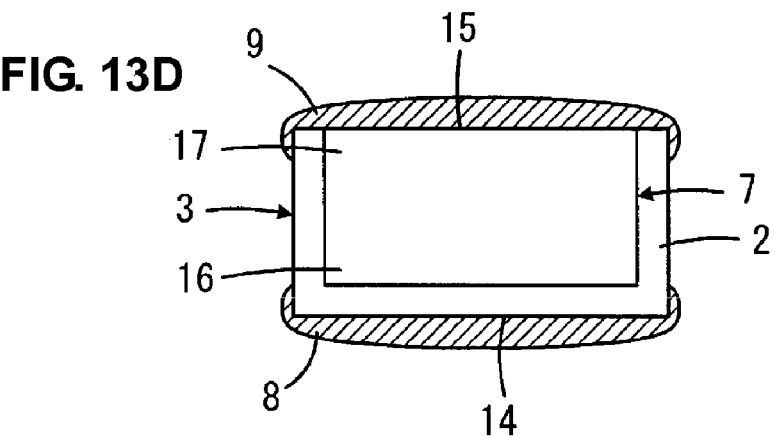

FIG. 11 corresponds to FIG. 10A and illustrates the location of the lead-out portion 17.

The first external terminal electrode 8 is disposed on the first end surface 14 of the capacitor body 3. Two ends of the first external terminal electrode 8 are disposed on portions of the first and second side surfaces 12 and 13 and extend to portions adjacent to the first end surface 14. Similarly, the second external terminal electrode 9 is disposed on the second end surface 15. Two ends of the second external terminal electrode 9 are disposed on portions of the first and second side surfaces 12 and 13 and extend to portions adjacent to the second end surface 15. The first and second external terminal electrodes 8 and 9 are thinner at both ends and thicker towards the center, when viewed on the first end surface 14 and the second end surface 15.

Accordingly, as an end point E of the lead-out portion 17 shown in FIG. 11 gets closer to, for example, the first side surface 12, the distance from the internal electrode 4 to the surface of the external terminal electrode 8 decreases. In contrast, as the end point E gets closer to the center, the distance from the internal electrode 4 to the surface of the external terminal electrode 8 increases.

In order to increase the ESR, it is better when the end point E is closer to the center. When the end point E is closer to the center while the capacitance portion 16 remains the same, the internal electrode 4 is substantially T-shaped. According to the fourth preferred embodiment, the lead-out portions 17 of the internal electrodes 4 to 7 do not completely overlap each other. Thus, the internal electrodes 4 to 7 are always asymmetrical and substantially T-shaped.

In contrast, in order to reduce the ESL, as in the first preferred embodiment, the first internal electrode 4 is substantially L-shaped in which one of two side edges of the lead-out portion 17 is substantially continuous with one of two side edges of the capacitance portion 16 on a substantially straight line. It is thus preferable that the end point E of the lead-out portion 17 is as close to the first side surface 12 of the capacitor body 3 as possible.

According to a fifth preferred embodiment shown in FIGS. 12A to 12D, the first internal electrode 4 and the fourth internal electrode 7 have substantially the same shape, and the second internal electrode 5 and the third internal electrode 6 have substantially the same shape. The other structure is substantially similar to that in the first preferred embodiment shown in FIGS. 3A to 3D.

According to a sixth preferred embodiment shown in FIGS. 13A to 13D, in each of the second internal electrode 5 and the fourth internal electrode 7, the width-direction size of the capacitance portion 16 is substantially the same as the width-direction size of the lead-out portion 17. When an ESR that is not as high as that of the first preferred embodiment shown in FIGS. 3A to 3D is required, internal electrode patterns such as those shown in the sixth preferred embodiment may be used.

In the foregoing preferred embodiments shown in the drawings, the monolithic ceramic capacitors each have the first to fourth internal electrodes. Alternatively, the present invention is applicable to monolithic ceramic capacitors that only have first to third internal electrodes.

Next, an experimental example conducted to examine the advantages of various preferred embodiments of the present invention will now be described.

In this experimental example, a monolithic ceramic capacitor was manufactured using the foregoing manufacturing method.

A monolithic ceramic capacitor to be manufactured was designed according to Table 1. As will be shown in Table 3 below, any one of the types shown in FIGS. 4A to 6B was adopted as a "lead-out form" (form of the lead-out portion of each internal electrode). Two types, that is, one including the "first layer" (first layer of each external terminal electrode) and the other including no "first layer", were manufactured. In addition, monolithic ceramic capacitors were manufactured by changing the "extraction width L2" (the width-direction size of the lead-out portion) to various sizes and changing the ratio "L2/L1" to various ratios.

TABLE 1

| | |
|---|---|
| Size of capacitor body | 0.8 mm × 1.6 mm × 0.5 mm |
| Ceramic material | Ceramic mainly containing $BaTiO_3$ |
| Thickness of ceramic layers | 2 μm |
| Material of internal electrodes | Ni |
| Width L1 of capacitance portion of each internal electrode | 1.3 mm |

TABLE 1-continued

| | |
|---|---|
| Thickness of each internal electrodes | 1 μm |
| Material of first layer of each external terminal electrode | ITO, B—Si—Zn—Ba—Ca—Al glass, Ni<br>ITO: glass 500 = by volume: 50% by volume<br>ITO: Ni = 85% by weight: 15% by weight |
| Thickness of first layer of each external terminal electrode | 20 μm |
| Material of second layer of each external terminal electrode | Cu, B—Si—Zn—Ba—Ca—Al glass<br>Cu: glass = 85% by weight: 15% by weight |
| Thickness of second layer of each external terminal electrode | 30 μm |
| Material of third layer of each external terminal electrode | Ni |
| Thickness of third layer of each external terminal electrode | 5 μm |
| Material of fourth layer of each external terminal electrode | Sn |
| Thickness of fourth layer of each external terminal electrode | 5 μm |

Conditions of firing the raw capacitor body and of baking the first layer and the second layer of each external terminal electrode were based on Table 2.

TABLE 2

| | |
|---|---|
| Firing temperature of raw capacitor body | Top 1200° C., in-out 25 hours |
| Firing atmosphere thereof | Reducing atmosphere |
| Baking temperature of first layer | Top 700° C., in-out 1 hour |
| Baking atmosphere thereof | Reducing atmosphere |
| Baking temperature of second layer | Top 650° C., in-out 1 hour |
| Baking atmosphere thereof | Reducing atmosphere |

The ESL of each monolithic ceramic capacitor according to samples 1 to 17 obtained in the foregoing manner was measured using a "network analyzer" (by Agilent Technologies) within a frequency range of about 0.5 GHz to about 1 GHz. The ESR of each of the samples was measured using an "impedance meter 4294A" (by Agilent Technologies) at a resonant frequency of each of the samples.

Measurement results of the ESL and ESR are summarized in Table 3. Table 3 shows an "ESR increase rate" and an "ESL increase rate". The "ESR increase rate" and the "ESL increase rate" of the samples 2 to 6 and 13 to 17 were computed on the basis of the ESR and the ESL of the sample 1, and the "ESR increase rate" and the "ESL increase rate" of the samples 8 to 12 were computed on the basis of the ESR and ESL of the sample 7.

TABLE 3

| Sample No. | Lead-out form | First layer | Extraction width L2 (mm) | (L2/L1) × 100 (%) | ESR (mΩ) | ESR increase rate (%) | ESL (pH) | ESL increase rate (%) |
|---|---|---|---|---|---|---|---|---|
| *1 | FIGS. 5A and 5B | Present | 1.3 | 100 | 267 | 100 | 208 | 100 |
| 2 | FIGS. 4A and 4B | Present | 1.04 | 80 | 292 | 109 | 208 | 100 |
| 3 | FIGS. 4A and 4B | Present | 0.88 | 67 | 335 | 125 | 212 | 102 |
| 4 | FIGS. 4A and 4B | Present | 0.65 | 50 | 390 | 146 | 212 | 102 |
| 5 | FIGS. 4A and 4B | Present | 0.52 | 40 | 475 | 178 | 211 | 101 |
| 6 | FIGS. 4A and 4B | Present | 0.26 | 20 | 808 | 303 | 240 | 115 |
| *7 | FIGS. 5A and 5B | Absent | 1.3 | 100 | 3.34 | 100 | 208 | 100 |
| *8 | FIGS. 4A and 4B | Absent | 1.04 | 80 | 4.10 | 123 | 208 | 100 |
| *9 | FIGS. 4A and 4B | Absent | 0.88 | 67 | 4.58 | 137 | 212 | 102 |
| *10 | FIGS. 4A and 4B | Absent | 0.65 | 50 | 5.10 | 153 | 212 | 102 |
| *11 | FIGS. 4A and 4B | Absent | 0.52 | 40 | 5.88 | 176 | 211 | 101 |
| *12 | FIGS. 4A and 4B | Absent | 0.26 | 20 | 6.16 | 185 | 240 | 115 |
| *13 | FIGS. 6A and 6B | Present | 1.04 | 80 | 336 | 126 | 215 | 103 |
| *14 | FIGS. 6A and 6B | Present | 0.88 | 67 | 403 | 151 | 226 | 109 |
| *15 | FIGS. 6A and 6B | Present | 0.65 | 50 | 537 | 201 | 248 | 119 |
| *16 | FIGS. 6A and 6B | Present | 0.52 | 40 | 671 | 251 | 264 | 127 |
| *17 | FIGS. 6A and 6B | Present | 0.26 | 20 | 1340 | 502 | 308 | 148 |

In Table 3, sample numbers with * are not within the scope of the present invention.

With continued reference to Table 3, compared with the sample 1, the samples 2 to 6 each have a similar ESL, but have a higher ESR. It is thus clear that the ESR can be increased without changing the thickness or material of the first layer, and that the ESL increase rate can be reduced to a low rate even when the width-direction size L2 of the lead-out portion is reduced.

Compared with the sample 7, each of the samples 8 to 12 have a similar ESL, but have a higher ESR. However, since each of the samples 8 to 12 has no first layer, the absolute value of the ESR is relatively small. Thus, the samples 8 to 12 are not suitable for desired applications.

The samples 13 to 17 have the same width-direction size L2 of the lead-out portion as that of the samples 2 to 6, respectively. However, the type of the "lead-out form" of the samples 13 to 17 is that shown in "FIGS. 6A and 6B". Since the lead-out portions of the first and third internal electrodes completely overlap each other when viewed in the laminated direction, the periphery of a region at which exposed portions of the internal electrodes are distributed becomes narrower, and thus, the ESL cannot be reduced to a small value.

While preferred embodiments of the invention have been described above, it is to be understood that variations and modifications will be apparent to those skilled in the art without departing the scope and spirit of the invention. The scope of the invention, therefore, is to be determined solely by the following claims.

What is claimed is:

1. A monolithic ceramic capacitor comprising:
a capacitor body including a plurality of ceramic layers laminated on one another, the plurality of ceramic layers including first to third ceramic layers, the capacitor body having first and second main surfaces facing each other, first and second side surfaces facing each other, and first and second end surfaces facing each other;
a first internal electrode disposed in an interior of the capacitor body, the first internal electrode including a capacitance portion arranged to form a capacitance and a lead-out portion lead out from the capacitance portion to the first end surface;
a second internal electrode disposed in the interior of the capacitor body, the second internal electrode including a capacitance portion arranged to form a capacitance and a lead-out portion lead out from the capacitance portion to the second end surface, the second internal electrode being electrically insulated from the first internal electrode via the first ceramic layer;
a third internal electrode disposed in the interior of the capacitor body, the third internal electrode including a capacitance portion arranged to form a capacitance and a lead-out portion lead out from the capacitance portion to the first end surface, the third internal electrode being electrically insulated from the second internal electrode via the second ceramic layer, the third internal electrode being arranged at a position different from that of the first internal electrode in a direction in which the ceramic layers are laminated;
a first external terminal electrode disposed on the first end surface of the capacitor body, the first external terminal electrode being electrically connected to the first internal electrode and the third internal electrode; and
a second external terminal electrode disposed on the second end surface of the capacitor body, the second external terminal electrode being electrically connected to the second internal electrode, the second external terminal electrode being connected to a potential different from that of the first external terminal electrode; wherein
a size of the first end surface and the second end surface in a two-dimensional surface in which the ceramic layers extend is greater than a size of the first side surface and the second side surface in the two-dimensional surface in which the ceramic layers extend;
the first external terminal electrode and the second external terminal electrode include a resistive component;
in each of the first internal electrode and the third internal electrode, a width-direction size of the lead-out portion measured in a direction substantially parallel to the first end surface is less than a width-direction size of the capacitance portion measured in the direction substantially parallel to the first end surface; and
the lead-out portion of the first internal electrode and the lead-out portion of the third internal electrode are located so as to partially overlap each other when viewed in the direction in which the ceramic layers are laminated.

2. The monolithic ceramic capacitor according to claim 1, wherein, in at least one of the first internal electrode and the third internal electrode, the width-direction size of the lead-out portion measured in the direction substantially parallel to the first end surface is at least about 39% of the width-direction size of the capacitance portion measured in the direction substantially parallel to the first end surface.

3. The monolithic ceramic capacitor according to claim 1, wherein at least one of the first internal electrode and the third internal electrode is substantially L-shaped in which one of two side edges of the lead-out portion in a direction in which the lead-out portion is lead out is substantially continuous with one of two side edges of the capacitance portion on a substantially straight line.

4. The monolithic ceramic capacitor according to claim 1, wherein at least one of the first internal electrode and the third internal electrode is substantially T-shaped in which two side edges of the lead-out portion in a direction in which the lead-out portion is lead out are substantially not continuous with two side edges of the capacitance portion on substantially straight lines.

5. The monolithic ceramic capacitor according to claim 1, wherein the first internal electrode and the third internal electrode have shapes that are substantial mirror images of each other.

6. The monolithic ceramic capacitor according to claim 1, further comprising:
a fourth internal electrode disposed in the interior of the capacitor body, the fourth internal electrode including a capacitance portion arranged to form a capacitance and a lead-out portion lead out from the capacitance portion to the second end surface, the fourth internal electrode being electrically insulated from the third internal electrode via the third ceramic layer, the fourth internal electrode being arranged at a position different from that of the second internal electrode in the direction in which the ceramic layers are laminated, the fourth internal electrode being electrically connected to the second external terminal electrode; wherein
in each of the second internal electrode and the fourth internal electrode, a width-direction size of the lead-out portion measured in a direction substantially parallel to the second end surface is less than a width-direction size of the capacitance portion measured in the direction substantially parallel to the second end surface; and
the lead-out portion of the second internal electrode and the lead-out portion of the fourth internal electrode are arranged so as to partially overlap each other or not to overlap each other when viewed in the direction in which the ceramic layers are laminated.

7. The monolithic ceramic capacitor according to claim 6, wherein, in at least one of the second internal electrode and the fourth internal electrode, the width-direction size of the lead-out portion measured in the direction substantially parallel to the second end surface is at least about 39% of the width-direction size of the capacitance portion measured in the direction substantially parallel to the second end surface.

8. The monolithic ceramic capacitor according to claim 6, wherein at least one of the second internal electrode and the fourth internal electrode is substantially L-shaped in which one of two side edges of the lead-out portion in a direction in which the lead-out portion is lead out is substantially continuous with one of two side edges of the capacitance portion on a substantially straight line.

9. The monolithic ceramic capacitor according to claim 6, wherein at least one of the second internal electrode and the fourth internal electrode is substantially T-shaped in which two side edges of the lead-out portion in a direction in which the lead-out portion is lead out are substantially not continuous with two side edges of the capacitance portion on substantially straight lines.

10. The monolithic ceramic capacitor according to claim 6, wherein the second internal electrode and the fourth internal electrode have shapes that are substantial mirror images of each other.

11. The monolithic ceramic capacitor according to claim 6, wherein the first internal electrode and the second internal electrode have substantially the same shape, and the third internal electrode and the fourth internal electrode have substantially the same shape.

12. The monolithic ceramic capacitor according to claim 6, wherein the first internal electrode and the fourth internal electrode have substantially the same shape, and the second internal electrode and the third internal electrode have substantially the same shape.

13. The monolithic ceramic capacitor according to claim 1, wherein the resistive component included in the first external terminal electrode and the second external terminal electrode includes a metal oxide.

14. The monolithic ceramic capacitor according to claim 1, wherein the capacitor body has a substantially rectangular parallelepiped shape.

15. A monolithic ceramic capacitor comprising:
a capacitor body including a plurality of ceramic layers laminated on one another, the plurality of ceramic layers including first to third ceramic layers, the capacitor body having first and second main surfaces facing each other, first and second side surfaces facing each other, and first and second end surfaces facing each other;
a first internal electrode disposed in an interior of the capacitor body, the first internal electrode including a capacitance portion arranged to form a capacitance and a lead-out portion lead out from the capacitance portion to the first end surface;
a second internal electrode disposed in the interior of the capacitor body, the second internal electrode including a capacitance portion arranged to form a capacitance and a lead-out portion lead out from the capacitance portion to the second end surface, the second internal electrode being electrically insulated from the first internal electrode via the first ceramic layer;
a third internal electrode disposed in the interior of the capacitor body, the third internal electrode including a capacitance portion arranged to form a capacitance and a lead-out portion lead out from the capacitance portion to the first end surface, the third internal electrode being electrically insulated from the second internal electrode via the second ceramic layer, the third internal electrode being arranged at a position different from that of the first internal electrode in a direction in which the ceramic layers are laminated;
a first external terminal electrode disposed on the first end surface of the capacitor body, the first external terminal electrode being electrically connected to the first internal electrode and the third internal electrode; and
a second external terminal electrode disposed on the second end surface of the capacitor body, the second external terminal electrode being electrically connected to the second internal electrode, the second external terminal electrode being connected to a potential different from that of the first external terminal electrode; wherein
a size of the first end surface and the second end surface in a two-dimensional surface in which the ceramic layers extend is greater than a size of the first side surface and the second side surface in the two-dimensional surface in which the ceramic layers extend;
the first external terminal electrode and the second external terminal electrode include a resistive component;

in each of the first internal electrode and the third internal electrode, a width-direction size of the lead-out portion measured in a direction substantially parallel to the first end surface is less than a width-direction size of the capacitance portion measured in the direction substantially parallel to the first end surface;

the lead-out portion of the first internal electrode and the lead-out portion of the third internal electrode are located so as to partially overlap each other or not to overlap each other when viewed in the direction in which the ceramic layers are laminated; and in at least one of the first internal electrode and the third internal electrode, the width-direction size of the lead-out portion measured in the direction substantially parallel to the first end surface is in a range of about 39% to about 80% of the width-direction size of the capacitance portion measured in the direction substantially parallel to the first end surface.

* * * * *